US005560829A

United States Patent [19]
Adams et al.

[11] Patent Number: 5,560,829
[45] Date of Patent: Oct. 1, 1996

[54] USE OF ALUMINOSILICATES OF THE ZEOLITE P TYPE AS LOW TEMPERATURE CALCIUM BINDERS

[75] Inventors: Christopher J. Adams; Abraham Araya; Peter Graham; Andrew T. Hight, all of Wirral, United Kingdom

[73] Assignee: Unilever Patent Holdings B.V., Vlaardingen, Netherlands

[21] Appl. No.: 96,820

[22] Filed: Jul. 28, 1993

[30] Foreign Application Priority Data

Jul. 31, 1992 [GB] United Kingdom ........ 9216386

[51] Int. Cl.$^6$ ........ C02F 1/42

[52] U.S. Cl. ........ 210/687; 423/700

[58] Field of Search ........ 423/700, 718; 210/667, 687

[56] References Cited

U.S. PATENT DOCUMENTS

| | | | |
|---|---|---|---|
| 4,219,535 | 8/1980 | Sugahara et al. | 423/718 |
| 4,265,777 | 5/1981 | Boyer et al. | 252/113 |
| 4,391,726 | 7/1983 | Koster | 252/99 |
| 4,605,509 | 8/1986 | Corkill et al. | 252/131 |
| 5,078,895 | 1/1992 | Dany et al. | 252/94 |
| 5,238,594 | 8/1993 | Chapple | 252/95 |
| 5,259,981 | 11/1993 | Chapple et al. | 252/95 |
| 5,259,982 | 11/1993 | Chapple | 252/95 |
| 5,298,183 | 3/1994 | Conner et al. | 252/174.25 |

FOREIGN PATENT DOCUMENTS

| | | |
|---|---|---|
| 038591 | 10/1981 | European Pat. Off. . |
| 384070 | 8/1990 | European Pat. Off. . |
| 0384070 | 8/1990 | European Pat. Off. . |
| 2620293 | 11/1977 | Germany . |

*Primary Examiner*—Mark L. Bell
*Assistant Examiner*—David Sample
*Attorney, Agent, or Firm*—Cushman Darby & Cushman, L.L.P.

[57] ABSTRACT

Alkali metal aluminosilicate of the zeolite P type having the oxide formula $M_{2/n}O.Al_2O_3.(1.80\text{–}2.66)SiO_2.yH_2O$, y being the water content, proves to have both excellent Calcium Effective Binding Capacity and Calcium Uptake Rate at temperatures below 25° C. The present invention provides for the use of such a zeolite P as a low temperature calcium binder.

2 Claims, 1 Drawing Sheet

USE OF ALUMINOSILICATES OF THE ZEOLITE P TYPE AS LOW TEMPERATURE CALCIUM BINDERS

FIELD OF THE INVENTION

Figure 1:
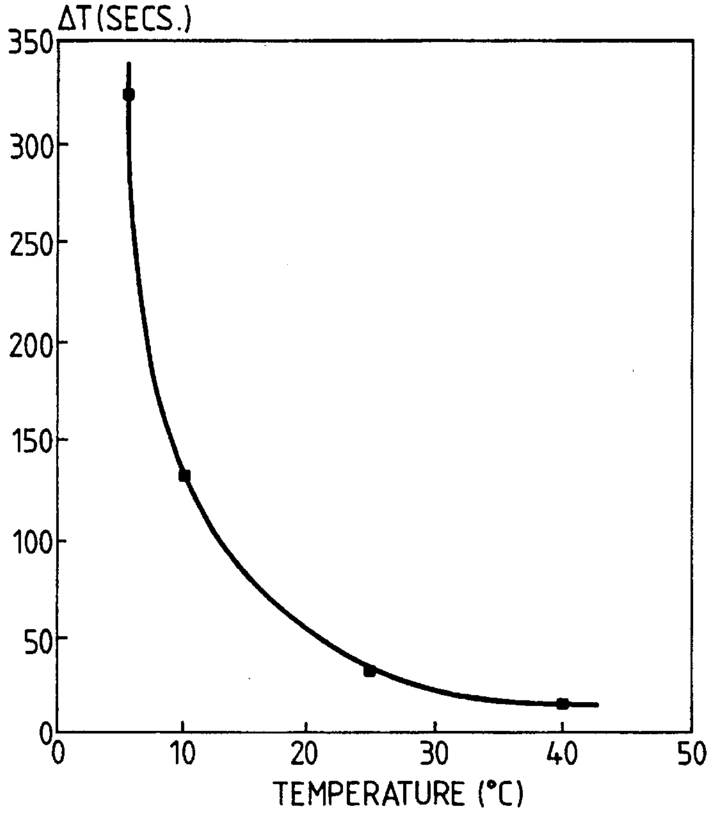

The present invention relates to the use of aluminosilicates of the zeolite P type as low temperature calcium binders. These materials are specifically useful in detergents formulations in which they remove calcium and magnesium ions by ion exchange and which are to be used at ambient temperature. These aluminosilicates will be referred to as zeolites P in this description.

BACKGROUND OF THE INVENTION

The zeolite P class includes a series of synthetic zeolite phases which may be in cubic configuration (also termed B or Pc) or tetragonal configuration (also termed P1) but is not limited to these forms. The structure and characteristics of the zeolite P class are given in "Zeolite Molecular Sieves" of Donald W Breck (published 1974 and 1984 by Robert E Krieger of Florida U.S.A.). The zeolite P class has the typical oxide formula:

$$M_{2/n}O.\ Al_2O_3.\ 1.80\text{–}5.00SiO_2.\ 5H_2O$$

M is an n-valent cation which for this invention is an alkali metal, that is lithium, potassium, sodium, caesium or rubidium with sodium and potassium being preferred and sodium being the cation normally used in commercial processes.

Thus sodium may be present as the major cation with another alkali metal present in a minor proportion to provide specific benefit.

In the present invention crystalline P-zeolites having a Si:Al ratio from 0.9 to 1.33 are used.

The utility of zeolites P in detergents formulations has been acknowledged. For example, European Patent Application 0384070 (Unilever) discloses the use of a specific zeolite P as detergency builders.

In EP0384070, comparisons of calcium binding capacity and calcium uptake rate are made between the specific zeolite P which is disclosed in that document and zeolite 4A.

It has now been found that certain zeolites P prove to have, at a temperature as low as 5° C., a very high calcium binding capacity as well as a very good rate of calcium ion uptake. Therefore, those materials are very useful as calcium binders when used at low temperature, i.e. below 25° C. Specifically, those materials are useful in detergents compositions which are used at ambient temperature.

GENERAL DESCRIPTION OF THE INVENTION

Accordingly, a first object of the present invention is the use of an alkali metal aluminosilicate of the zeolite P type having the oxide formula $M_{2/n}O.Al_2O_3.(1.80\text{–}2.66)SiO_2.yH_2O$, y being the water content, as calcium binder below 25° C..

A second object of the present invention is a process for washing fabrics at a temperature below 25° C., for at least a part of a washing cycle, with a detergent composition comprising a surfactant system, a detergency builder system and optionally other conventional components, the detergency builder system comprising a zeolite P type having the oxide formula $M_{2/n}O.Al_2O_3.(1.80\text{–}2.66)SiO_2.yH_2O$, y being the water content. Usually the detergent composition contains 20% to 80% by weight of the detergency builder system and may contains 5% to 80% by weight of the alkali metal aluminosilicate.

A third object of the present invention is to provide a process for removing calcium ions, by ion exchange, from an aqueous solution at a temperature of below 25° C. wherein an effective amount of an alkali metal aluminosilicate of the zeolite P type having the oxide formula $M_{2/n}O..Al_2O_3.(1.80\text{–}2.66)\ SiO_2.yH_2O$, y being the water content, is used as ion exchanger.

STANDARD PROCEDURES

In the characterisation of the zeolite P materials used in the present invention, the following methods were used.

i. Particle size: The average particle size (microns) was measured by a Malvern Mastersizer (Trade Mark) obtainable from Malvern Instruments, England and expressed as the $d_{50}$, i.e. 50% by weight of the particles have a diameter smaller than the diameter quoted. The definitions $d_{80}$ and $d_{90}$ may also be used in association with the appropriate figure.

ii. Calcium uptake rate (CUR): The rate of removal of Ca ions from a wash liquor is an important characteristic of a detergency builder. The time, in seconds, is taken from a zeolite, at a concentration of 1.85 g $dm^{-3}$ and at various temperatures, to reduce the calcium ion concentration in a 0.01M sodium chloride solution from an initial value of $2\times10^{-3}$M to $10^{-5}$M. The zeolite was first equilibrated to constant weight over saturated sodium chloride solution and the water content measured.

The titrator used was a Radiometer Titralab (Trade Mark). This method provides a realistic indicator of Calcium Uptake Rate in wash liquor environment.

iii. Calcium effective binding capacity (CEBC): The CEBC was measured in the presence of a background electrolyte to provide a realistic indicator of calcium ion uptake in a wash liquor environment. A sample of each zeolite was first equilibrated to constant weight over saturated sodium chloride solution and the water content measured. Each equilibrated sample was dispersed in water (1 $cm^3$), in an amount corresponding to 1 g of anhydrous zeolite per $dm^3$, and the resulting dispersion (1 $cm^3$) was injected into a stirred solution, consisting of 0.01M NaCl solution (50 $cm^3$) and 0.05M $CaCl_2$ (3.923 $cm^3$), therefore producing a solution of total volume 54,923 $cm^3$. This corresponded to a concentration of 200 mg CaO per litre, i.e. just greater than the theoretical maximum amount (197 mg) that can be taken up by a zeolite of Si:Al ratio 1.00. The change in $Ca^{2+}$ ion concentration was measured by using a $Ca^{2+}$ ion selective electrode, the final reading being taken after 15 minutes. The temperature was maintained at a specific temperature throughout. The $Ca^{2+}$ ion concentration measured was subtracted from the initial concentration, to give the effective calcium binding capacity of the zeolite sample as mg CaO/g zeolite.

PREPARATION OF THE ALKALI METAL ALUMINOSILICATE

Zeolite P can be prepared by reacting a silica source and an alkali metal aluminate, generally a sodium aluminate. In order to prepare a zeolite P having the oxide formula $M_{2/n}O.Al_2O_3.(1.80\text{–}2.66)SiO_2\ .yH_2O$, wherein y is the water content, a sodium aluminate solution at a temperature of at least 25° C. is mixed with a sodium silicate solution at a temperature of at least 25° C. in a stirred vessel in the presence of a slurry of P zeolite seed to form a gel having the composition, $$Al_2O_3:(1.00\text{–}3.5)SiO_2:(1.2\text{–}7.5)Na_2O:(25\text{ to }450)H_2O.$$

The gel is then aged at a temperature above about 25° C. with adequate stirring to maintain solids in suspension for period of at least 0.1 hours. The zeolite P product is then washed and dried.

The source of zeolite P is not critical, although preferably it is added to the reactants as a previously prepared slurry. Alternatively, a crystallised slurry from a previous reaction may be used. Additionally, the Si:Al ratio of the zeolite P seed is not critical and a ratio above 1.33 can be used.

DETERGENTS COMPOSITIONS

The zeolite P may be incorporated in detergent compositions of all physical types, for example, powders, liquids, gels and solid bars, at the level normally used for detergency builders. The formulation principles already established for the use of zeolite 4A in detergent compositions may generally be followed. A specific class of detergent composition to which the invention is especially applicable are products which are used, at least for a part of a washing cycle, at low temperature, i.e. between 5° C. and 25° C..

SPECIFIC DESCRIPTION OF THE INVENTION

Figure 2:
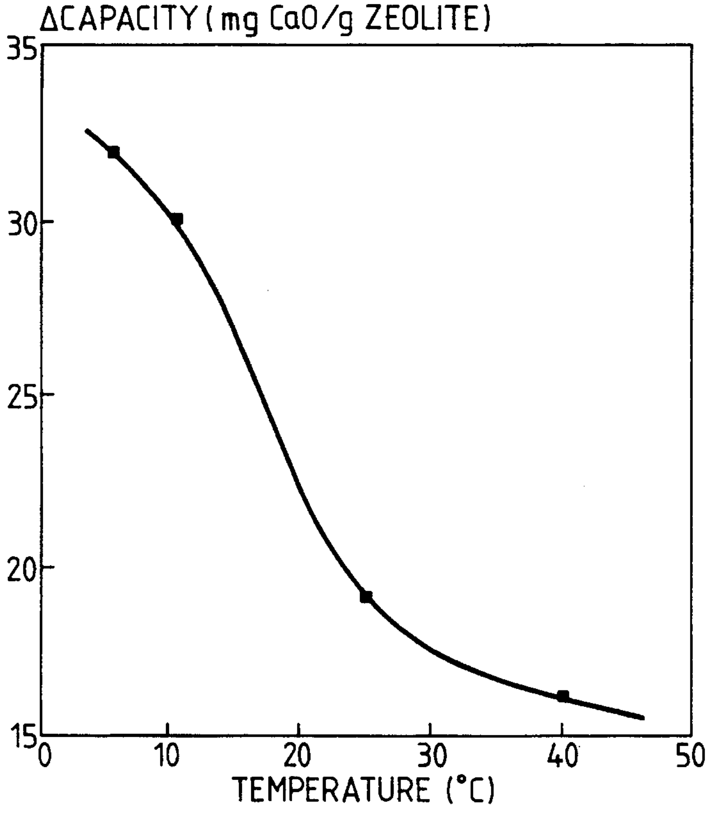

In order that the present invention may be further understood it will be described hereafter by means of examples and with reference to the following Figures where:

FIG. 1 represents the difference in Calcium Uptake Rate between a zeolite 4A and a zeolite P according to the present invention, at different temperatures, FIG. 2 represents the difference in Calcium Effective Binding Capacity between a zeolite 4A and a zeolite P according to the present invention, at different temperatures.

ZEOLITE P PREPARATION

Zeolite P seed preparation:

A sample of zeolite P was produced using the following procedure. 1420 g of 2M sodium hydroxide solution and 445 g of commercial sodium aluminate solution (concentration 20% $Na_2O$, 20% $Al_2O_3$) ($Na_2O/Al_2O_3$=1.64) were placed in a 5 litre baffled flask connected to a reflux condenser. The resultant solution was stirred and heated to 90° C. 450 g of commercial sodium silicate solution (($SiO_2$ 28.3%/13.8% $Na_2$) w/w) $SiO_2/Na_20$=2:1) was diluted with 1100 g of deionised water. The diluted silicate solution was heated to 75° C. and added to the stirred caustic aluminate solution over 18 minutes. The resultant reaction mixture gel was allowed to react at 90° C. with stirring for 5 hours. The product was filtered, washed and dried.

Zeolite P preparation:

Solutions A, B and C were prepared.

Solution A—648 g of 2M sodium hydroxide solution

Solution B—952 g of commercial sodium silicate solution as used in the seed reaction —470 g of 2M sodium hydroxide solution —20 g of zeolite P seed slurried in 30 g deionised water.

Solution C—1139.5 g of commercial sodium aluminate (20% $Na_2O$, 20% $Al_2O_3$) —805 g of 2M NaOH solution.

Solution A was placed in a 5 litre round bottomed baffled flask with pitch blade turbine (500 rpm) having a reflux condenser and heated to 90° C. with vigorous stirring.

Solution B and solution C were first preheated to 80° C. and added, beginning simultaneously, to solution A over 20 minutes and 40 minutes respectively. The reaction gel was allowed to react at 90° C. with stirring for 5 hours. The product was filtered, washed and dried.

It was obtained a zeolite P having a $SiO_2/Al_2O_3$ ratio of 2.00. The average particle size ($d_{50}$) was 0.90 microns.

Effect of temperature on the calcium uptake rate

The Calcium Uptake Rate (CUR) of a zeolite P, produced as above-described, was compared with the CUR of a zeolite 4A commercially available under the Trade Mark WESSALITH P. This zeolite 4A had an average particle size ($d_{50}$) of 4.3 microns.

Thus, the time, in seconds, taken for each material, at a concentration of 1.85 g $dm^{-3}$, to reduce the $Ca^{2+}$ concentration in an 0.01M sodium chloride solution from an initial value of $2\times10^{-3}$M to $10^{-5}$M, was measured at different temperatures.

The results are summarised in the following table.

| Temperature (°C.) | Time (seconds) to reach $10^{-5}$ M $Ca^{2+}$ Zeolite 4A | Zeolite P |
|---|---|---|
| 5 | 385 | 55 |
| 10 | 155 | 22 |
| 25 | 35 | 4 |
| 40 | 18 | 2 |

It is immediately apparent that, for temperatures below 25° C., the CUR of the zeolite P used in the present invention is always significantly faster than the CUR of zeolite 4A. Even more important is the fact that, using a zeolite P, a concentration of $10^{-5}$M is obtained in less than 60 seconds at 5° C.

FIG. 1 clearly shows that the difference in term of CUR is particularly important below 25° C.

Effect of temperature on calcium binding capacity

Using the same zeolite 4A and the same zeolite P, the Calcium Effective Binding Capacity was assessed according to the above-described method.

The results are summarised in the following table.

| Temperature | Calcium Effective Binding Capacity (mg CaO/ g zeolite) | |
|---|---|---|
| (°C.) | Zeolite 4A | Zeolite P |
| 5 | 116 | 148 |
| 10 | 132 | 162 |
| 25 | 147 | 166 |
| 40 | 158 | 177 |

Thus, it is apparent that the CEBC of zeolite P is much less sensitive to temperature that the CEBC of zeolite 4A. FIG. 2 clearly shows that the difference in term of CEBC is particularly important below 25° C..

Effect of temperature on detergency

In this experiment, the detergencies of two wash liquors containing respectively zeolite P, produced as above described, and zeolite 4A (Wessalith P), as above described, were compared at two different temperatures and wash times.

The wash liquors composition were as follows (in g/1):

| | Zeolite P | Zeolite 4A |
|---|---|---|
| Linear $C_{11-13}$ alkylbenzene sulphonate | 0.19 | 0.19 |
| Nonionic surfactant (7EO) | 0.14 | 0.14 |
| Tallow soap | 0.08 | 0.08 |
| Zeolite 4A (hydrated basis) | — | 1.64 |
| Zeolite P (hydrated basis) | 1.58 | — |
| Acrylic/maleic copolymer | 0.14 | 0.14 |
| Sodium silicate | 0.02 | 0.02 |
| Sodium carboxymethylcellulose | 0.03 | 0.03 |
| Sodium carbonate | 0.39 | 0.39 |
| Sodium metaborate | 0.88 | 0.88 |
| Fluorescer | 0.01 | 0.01 |

Builder-sensitive test cloths were washed in tergotometers at a liquor to cloth ratio of 20:1 and an agitation speed of 100 rpm. Detergency was assessed by measuring reflectance at 460 nm before and after the wash: the higher the difference, the better the cleaning.

In a first experiment (test 1), cotton cloth soiled with oil silica and ink was washed at 20° C. and 40° C. In a second experiment (test 2), cotton cloth soiled with casein was also washed at 20° C. and 40° C. The results are summarised in the following table.

| Test | 1 | 1 | 2 | 2 | |
|---|---|---|---|---|---|
| Temperature (°C.) | 20 | 40 | 20 | 40 | Wash |
| time (minutes) | 10 | 30 | 10 | 30 | |
| Reflectance increase | | | | | |
| Zeolite P | 17.4 | 23.9 | 13.2 | 18.7 | |
| Zeolite 4A | 10.7 | 22.7 | 10.1 | 17.4 | |

The results show the expected superiority of the zeolite P under the near-equilibrium conditions of the 40° C. 30-minute wash and demonstrate the greater superiority of the zeolite P under the more forcing conditions of the 20° C. 10-minute wash.

We claim:

1. Process for removing calcium ions, by ion exchange, from an aqueous solution at a temperature of between 5° C. and 10° C. wherein an effective amount of an alkali metal aluminosilicate of the zeolite P type having the oxide formula $M_{2/n}O.Al_2O_3$. $(1.80–2.66)SiO_2.yH_2O$, y being the water content, sufficient to bind and remove calcium ions from the aqueous solution is used as ion exchanger.

2. A process for binding calcium ions in aqueous solution at a temperature between 5° C. and 10° C. which comprises contacting the solution with an alkali metal aluminosilicate of the zeolite P type having the oxide formula $M_{2/n}O.Al_2O_3$. $(1.80–2.66)SiO_2.yH_2O$, y being the water content.

* * * * *